Aug. 26, 1924.                                                      1,506,568
                              E. M. COLE
                      GEAR POSITIONING MECHANISM
                         Filed Jan. 16, 1922          2 Sheets-Sheet 1

Inventor
Eugene M. Cole,
By J. Hanson Boyden
                Attorney

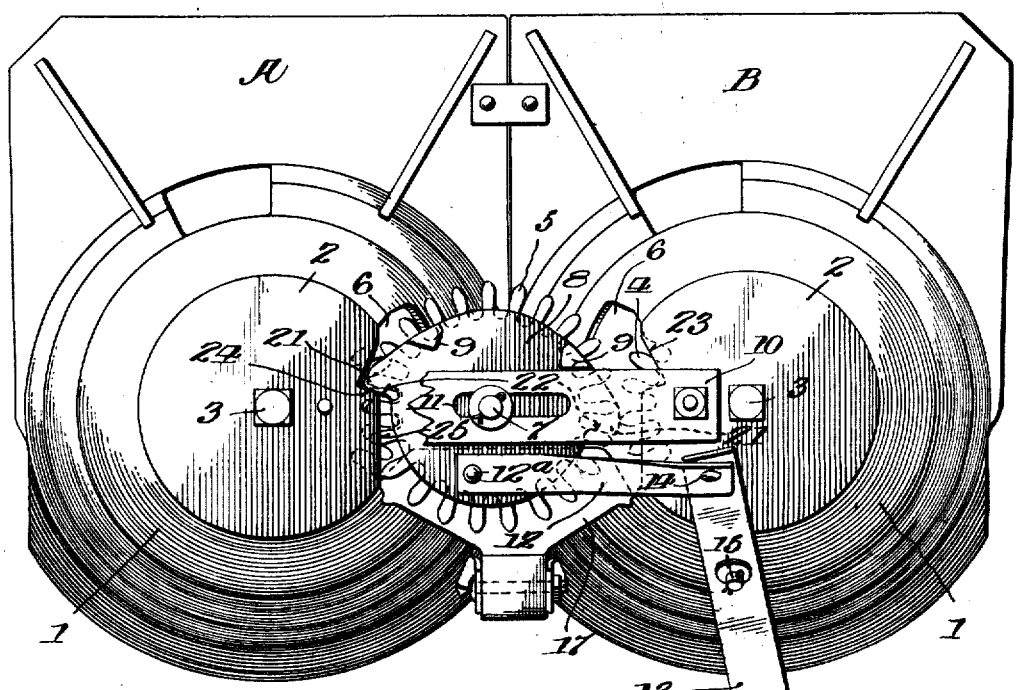
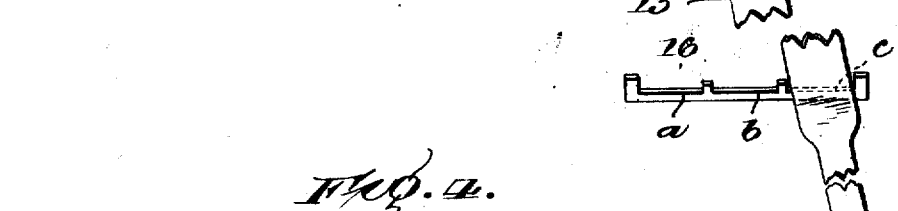
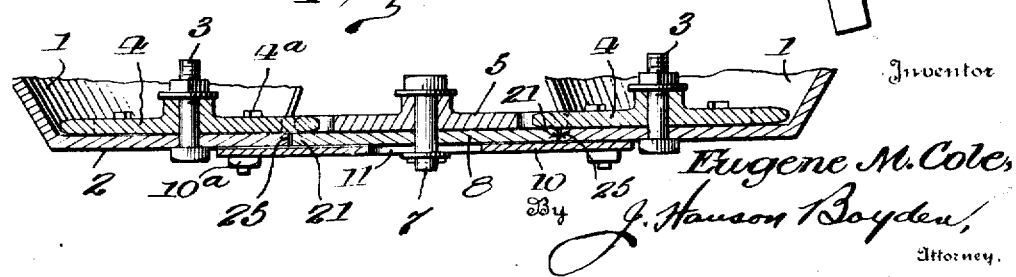

Patented Aug. 26, 1924.

1,506,568

UNITED STATES PATENT OFFICE.

EUGENE M. COLE, OF CHARLOTTE, NORTH CAROLINA.

GEAR-POSITIONING MECHANISM.

Application filed January 16, 1922. Serial No. 529,614.

*To all whom it may concern:*

Be it known that I, EUGENE M. COLE, a citizen of the United States, residing at Charlotte, in the county of Mecklenburg and State of North Carolina, have invented certain new and useful Improvements in Gear-Positioning Mechanism, of which the following is a specification.

This invention relates to toothed gearing, and is in the nature of an improvement on the mechanism covered by my prior Patent No. 1,388,171, dated August 23, 1921.

While, as indicated by said patent, the type of gearing in question is particularly designed for use in connection with seed planters, it will, of course, be understood that the present invention is not limited to such use, but is capable of general application.

The above patent shows a movable gear mounted between two other gears and so arranged that it is capable of meshing with either one or both of said other gears as desired, this result being due to the peculiar formation of the teeth. The present invention relates to gears having teeth of the same character.

While in the construction of the said patent a hand lever was provided for shifting the movable gear into and out of mesh with the others, as described, it has been found that, owing to lost motion in the connections, and for other reasons, it is difficult to accurately position the movable gear by means of such a lever alone. The general object, therefore, of the present invention is to provide means, in addition to the hand lever or shifting means, for positively and definitely positioning the movable gear, or for arresting its travel at definite points as it is shifted, so that it will properly engage with the other gears. A special object of the invention is to provide means for arresting the travel of the movable gear and locking it in its intermediate position in which it meshes with both of the other gears simultaneously. The above mentioned positioning and locking mechanism is actuated by the movement of the shifting lever itself, so that no additional complications are imposed upon the operator.

In order that the invention may be readily understood, reference is had to the accompanying drawings forming a part of this specification, and in which:

Figure 3 is a view similar to Figure 1, showing the parts in shifted position; and Figure 4 is a vertical central section through the parts shown in Figure 2.

Figure 1:
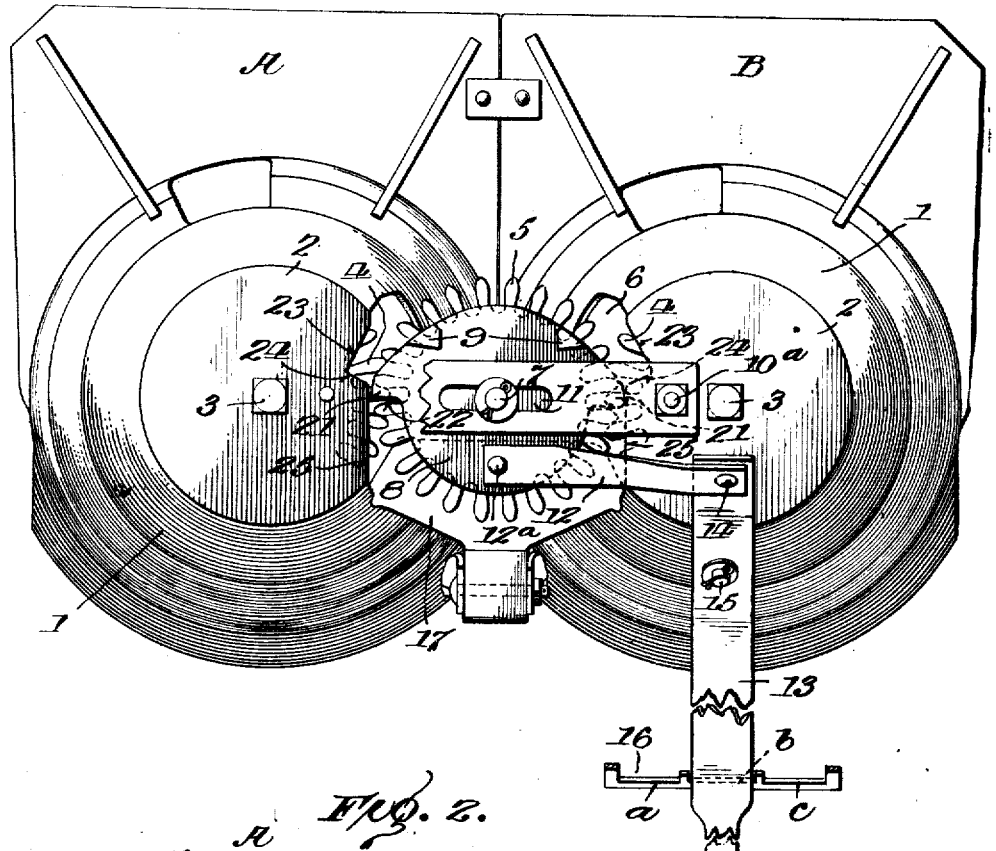
Figure 1 is an inverted plan view of a pair of hoppers employed in a duplex seed planter and equipped with my improved gearing, parts being broken away for the sake of clearness.

Referring to the drawings in detail, it will be seen that the construction illustrated is generally similar to that shown in the above mentioned patent. Two hoppers A and B are illustrated, arranged side by side to constitute a twin or duplex planter. Each hopper comprises a bowl or basin 1 having a flat bottom 2, and on the bottom of each bowl rests a seed plate operating gear 4 journaled on a pin or bolt 3 passing through the bottom 2 of the bowl.

Figure 2:
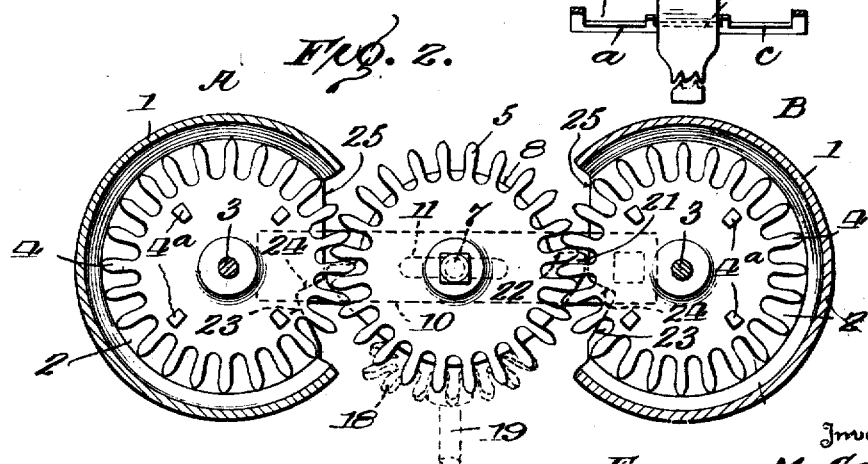
Figure 2 is a sectional plan of such a pair of hoppers, the section being taken at a point just above the plane of the gears.

Intermediate the two gears 4, and lying in the same plane, as shown in Figure 3, is a driving gear 5. The three gears 4 and 5 are provided with extra long teeth of peculiar shape, as shown and described in my above mentioned patent, and by virtue of this construction the gear 5 is capable of meshing with one of the gears 4, to substantially the full depth of the teeth, as shown in Figure 3, or meshing with both of the gears 4 to substantially half the depth of the teeth, as shown in Figures 1 and 2.

In meshing with the gears 4, the gear 5 projects through openings 6 formed near the bottom of each hopper bowl.

In order to permit the gear 5 to selectively mesh with the gears 4, as described, it is rotatably mounted on a stud or bolt 7 which works freely through the elongated slot 11 in a supporting plate or bracket 10 secured to the hopper bottoms. By virtue of this arrangement, it will be seen that the gear 5 is free to slide laterally toward and from the gears 4.

Between the gear 5 and supporting plate or bracket 10 is another plate or carrier member 8, which is also pivotally mounted on the stud 7. This carrier member, in addition to its pivotal movement around the stud 7, is also capable of bodily sliding or laterally shifting movement relative to the hopper bottoms and in this lateral sliding movement it of course carries the gear 5 with it.

Referring to Figures 1 and 3, it will be seen that the lower side of the plate or carrier member 8 is provided with a pair of lugs 9 which are adapted to engage the edge of the plate or bracket 10 to limit the pivotal movement or angular adjustment of the plate 8 about the pin 7. In Figure 3, the plate 8 is shown at one limit of its angular movement, with one of the stop lugs 9 engaging the plate 10. The action of these stop lugs will be hereinafter further discussed.

In order to shift the plate or carrier member 8, and with it the movable gear 5, toward and from the other gears, I provide a link 12 which is pivotally attached at one end to an operating lever 13, as indicated at 14, such operating lever being itself pivotally mounted at 15 on a fixed support, such as the side of the hopper, and working at its outer end through a keeper 16 formed with three positioning notches a, b and c, as in my prior patent.

While in my said prior patent I have shown the link 12 as attached to the center pin 7, in the present construction I pivotally attach the link 12 to the carrier member or plate 8 at some point, such as 12a, to one side of the pivotal center of said plate. By virtue of this eccentric connection, a pull or thrust exerted upon the link 12 tends to turn or rock the carrier member or plate 8 upon the pivot 7.

In the present invention I rely upon this rocking movement of the plate 8 to accurately position the gear 5 in either of its two relations with the gears 4, and to this end the edge of the plate 8 is of peculiar formation. It is provided with two almost diametrically opposite points or projections 21, these projections having substantially radial shoulders 22 on one edge thereof, and the periphery of the plate adjacent the bases of these shoulders being preferably circular. It will be noted that the shoulders 22 face in opposite directions. The contour of the plate 8 between the outer ends of the projections 21 is shown as somewhat elliptical, but the exact shape is immaterial.

The plate or carrier member 8, above described, lies in the same plane as the bottoms 2 of the hopper bowls, as clearly shown in Figure 4, and is substantially of the same thickness. Adjacent the opening 6 each bottom 2 is cut away so as to form a notch 23 adapted to receive the projections 21 on the plate 8 and a straight portion or edge 25 against which the ends of the projections 21 abut under certain conditions. Each notch 23 has an inclined edge or shoulder 24 which is adapted to cooperate with the shoulders 22 formed by the projections 21.

A fixed plate 17, suitably secured to the hoppers A and B, is located between them in such position, as to partially overlie the gear 5. In other words, the gear 5 runs between the plates 8 and 17 and is thus maintained in the proper plane.

The operation of my improved gear positioning mechanism will now be briefly described. Assuming the parts to be in the position shown in Figure 3, with the operating lever in notch c of the keeper, and with the gear 5 in full mesh with one of the gears 4 and out of mesh with the other, it will be seen that as the gear 5 revolves, driven by the power gear 18 carried by a shaft 19 (see Figure 2), as in my said prior patent, one of the gears 4 will be rotated while the other one will remain stationary. In this position of the parts it will be noted that one of the projections 21 is received into the corresponding notch 23 of the hopper bottom, and that the point of the projection engagement with the bottom of the notch serves to limit the depth to which the gear teeth engage.

If now it is desired to shift the gear 5 into its intermediate position, in which it meshes with both of the gears 4, as indicated in Figure 1, the lever 3 is swung to the left toward the notch b of the keeper, thus exerting a pull on the link 12. Although this pull tends to turn or oscillate the plate 8 upon its pivot 7, such turning or pivotal movement is prevented by reason of the engagement of the shoulder 22 on the plate 8 with the inclined edge 24 of the notch 23 in the hopper bottom 2. Therefore the first effect of the movement of the lever 13 will be to shift the carrier member 8, together with the gear 5, bodily to the right, the pin 7 traveling in the slot 11. This traveling movement continues until the shoulder 22 of the projection 21 clears the edge 24 of the notch 23, and further movement of the lever 13, after this occurs, immediately results in swinging or angularly displacing the carrier member or plate 8 about the pivot 7. Figure 1 shows the position of the parts after this first angular displacement has occurred, and it will be noted that at this point the lever 13 has reached the middle notch b of the keeper. Considering the position of the parts shown in Figure 1, it will be seen that the end of the projection 21 which has just ridden up out of the notch 23 of hopper bottom A engages the straight edge 25 of said bottom, and the parts are so proportioned that the end of the opposite projection 21 is also at this moment in substantial engagement with the straight edge 25 of the bottom of hopper B. Thus the two projections 21 of the carrier member or plate 8 lie snugly between and abut against the two straight edges 25 of the hopper bottoms, thereby temporarily locking the carrier member 8 against bodily movement in either direction. In this way the gear 5, which is mounted on the carrier member is accurately located in its intermediate position and is locked in such position, in which it meshes with both gears 4 for substantially half the depth of the teeth. Both gears 4, and both seed plates (not shown) driven thereby, will thus be rotated.

If now it be desired to cause the seed plate of hopper A to remain stationary, the lever 13 is shifted still further to the left and into notch a of the keeper. The first result of a further movement of the lever 13 to the left as it leaves notch b is to cause an additional angular displacement of the plate or carrier member 8 about the pivot 7, such angular displacement continuing until the left hand lug 9 engages the edge of the plate or bracket 10. When this occurs the angular displacement of the carrier member has been sufficient to enable the right end projection 21 to clear the edge of the notch 23 in the bottom of hopper B, and a further movement of the lever 13 into the notch a of the keeper results in bodily shifting the carrier member and gear 5 to the right until the end of the right hand projection 21 engages the bottom of the notch 23 in the bottom of hopper B. In this position the gear 5 is in full mesh with the gear 4 of hopper B and is entirely out of mesh with the gear 4 of hopper A.

It will thus be seen that all of the operations are produced by the simple movement of the shifting lever 13 from one notch to the other of the keeper, as in my prior patent, such movement of the operating lever serving to first shift the carrier member and gear 5 bodily, then turn or rock the carrier member upon its pivot so that it is locked against further bodily movement, and finally to release the carrier member by an additional angular displacement and to further shift it bodily so as to carry the gear 5 into position where it is in full mesh with one of the gears 4 only.

It will be seen that these results are obtained by virtue of the peculiar formation of the carrier member and hopper bottoms, such bottoms constituting fixed abutments with which the carrier member engages, and said abutments and carrier member having interlocking parts which cooperate to selectively position the movable gear at either one of three definite points. In the appended claims I have referred to the gears 4 as "fixed gears," meaning, of course, by this that they are capable only of rotation and do not partake of bodily movement.

What I claim is:

1. The combination with a fixed and a movable gear, of means for shifting the latter into and out of mesh with the former, and means in addition to said shifting means and independent of but shiftable with said movable gear for automatically arresting the travel of the movable gear at a certain definite point, while permitting it to be shifted beyond such point.

2. The combination with a fixed and a movable gear, of means for shifting the latter into and out of mesh with the former, and means in addition to said shifting means and independent of but shiftable with said movable gear for automatically arresting the travel of the movable gear at either desired one of two definite points.

3. The combination with a fixed and a movable gear, of means for shifting the latter into and out of mesh with the former, and means in addition to said shifting means for definitely positioning said movable gear with its teeth engaging the other for only a portion of their depth.

4. The combination with a fixed and a movable gear, of means for shifting the latter into and out of mesh with the former, and means in addition to said shifting means for definitely positioning said movable gear so that its teeth engage the other either to substantially their full depth, or to only approximately half their depth, as desired.

5. The combination with a pair of fixed gears, and a movable gear mounted between them, of means for shifting the latter into mesh with either one of said fixed gears, or simultaneously with both of said gears, as desired, and means in addition to said shifting means for definitely positioning said movable gear in mesh with the others, as described.

6. The combination with a pair of fixed gears, and a movable gear mounted between and shiftable relative to said fixed gears, of means for shifting said movable gear, and means in addition to said shifting means for definitely positioning said movable gear so as to cause it to mesh with either one of said fixed gears, or simultaneously with both of them, as desired.

7. The combination with a fixed and a movable gear, and a lever for shifting the latter, of means in addition to said lever for arresting the travel of said movable gear at a certain definite point, and means whereby the initial movement of said lever serves to position said arresting means, and a further movement in the same direction serves to remove said arresting means and bring the gears into full mesh.

8. The combination with a fixed and a movable gear, of means for shifting the latter into and out of mesh with the former, and means in addition to said shifting means, and actuated automatically at each operation thereof for arresting the travel of said movable gear at either desired one of two definite points.

9. The combination with a pair of fixed and a movable gear, of means for shifting the latter into and out of mesh with the former, and means in addition to said shifting means, and operated thereby, for definitely and automatically positioning said movable gear so as to cause it to mesh with either one of said fixed gears, or simultaneously with both of them, as desired.

10. The combination with a fixed and a movable gear, of a carrier member on which said movable gear is rotatably mounted, and means for shifting said carrier member and with it the movable gear toward and from the fixed gear, said carrier member having means to limit the travel of said movable gear.

11. The combination with a fixed and a movable gear, of a carrier member on which said movable gear is rotatably mounted, and means for shifting said carrier member and with it the movable gear toward and from the fixed gear, said carrier member having stop shoulders for arresting the travel of said movable gear in either one of two definite positions.

12. The combination with a fixed and a movable gear, of a carrier member on which said movable gear is rotatably mounted, means for both slidably and pivotally supporting said carrier member, means for slidably adjusting said member and movable gear toward and from said fixed gear, and for rocking said member on its pivot, and means governed by the annular displacement of said carrier member on its pivot for selectively arresting its sliding movement and that of the carrier gear in either one of two definite positions.

13. The combination with a pair of gears, a fixed abutment adjacent each gear, a movable gear disposed between said first mentioned gears, a carrier member on which said movable gear is mounted, and means for shifting said carrier and movable gear relative to the other gears, said carrier member being shaped and arranged to engage said fixed abutments to limit the travel of said movable gear.

14. The combination with a pair of gears, a fixed abutment adjacent each gear, a movable gear disposed between said first mentioned gears, a carrier member on which said movable gear is mounted, and means for shifting said carrier and movable gear relative to the other gears, said carrier member and abutments being provided with interengaging parts whereby said movable gear is definitely positioned so as to cause it to mesh with either one of said other gears, or simultaneously with both of them, as desired.

15. The combination with a fixed and a movable gear, of a carrier member on which said movable gear is mounted, means whereby said carrier member serves to limit the travel of said movable gear toward the fixed gear, and means for adjusting said carrier member so as to cause it to definitely position said gears with their teeth in mesh either for substantially their full depth, or for approximately half their depth, as desired.

16. The combination with a fixed and a movable gear, of a carrier member on which said movable gear is mounted, means for both slidably and pivotally supporting said carrier member, means for slidably shifting said carrier member, such shifting means being pivotally attached to said member at one side of its pivotal support, whereby said member is anularly adjusted as well as shifted, means for limiting the angular movement of said member, and means controlled by the angular adjustment of said member for selectively positioning said movable gear relative to said fixed gear.

17. The combination with a pair of fixed gears and a movable gear disposed between them, an operating lever for shifting said movable gear, means whereby the initial movement of said lever serves to shift said movable gear into a position where it meshes simultaneously with both of said fixed gears, means whereby a further movement of said lever in the same direction locks said movable gear in said position, and means whereby a still further movement of the lever in the same direction serves to first release such lock and then shift said movable gear into position where it meshes with one only of said fixed gears.

18. The combination with a pair of fixed gears and a movable gear disposed between them, a carrier member on which said movable gear is mounted, and having means for definitely positioning said gear, a lever connected to said carrier member, and means whereby said lever, by an initial movement, shifts said carrier member and movable gear bodily into a position in which said movable gear meshes simultaneously with both of said fixed gears, by a further movement in the same direction angularly adjusts said carrier member so as to lock it and the movable gear in said position, and by a still further movement in the same direction first turns said carrier member so as to release it, and then shifts it and the movable gear into position where the latter meshes with one only of said fixed gears.

19. The combination with a pair of spaced gears having fixed abutments adjacent thereto, of a shiftable plate disposed between said abutments, a movable gear mounted on said plate, and means for shifting said plate and gear, said plate and abutments having interlocking parts serving to definitely position said movable gear so as to cause it to mesh with either one or simultaneously with both or said fixed gears.

In testimony whereof I affix my signature.

EUGENE M. COLE.